UNITED STATES PATENT OFFICE.

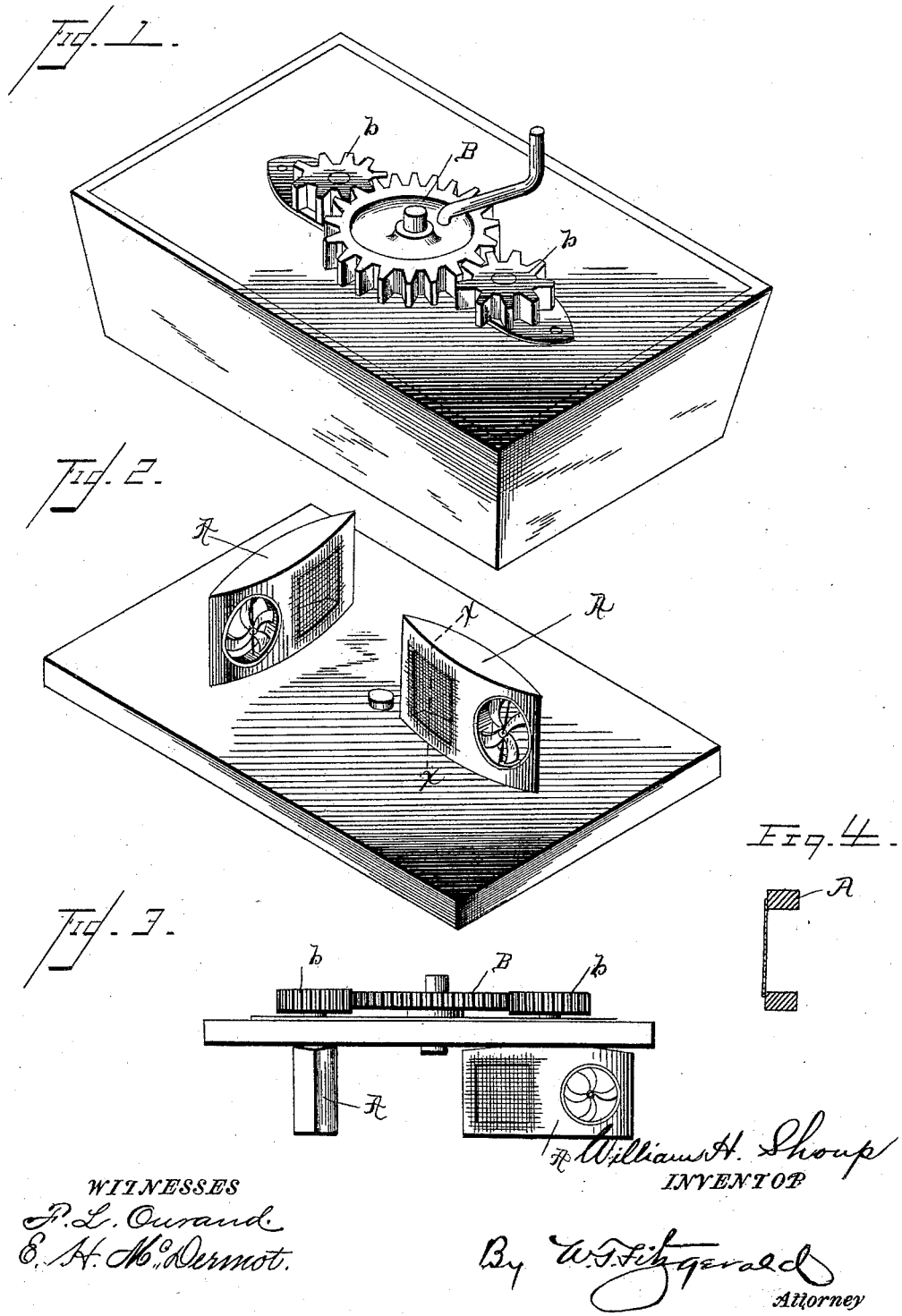

WILLIAM HENRY SHOUP, OF MIDDLEBURY, INDIANA.

CHURN.

SPECIFICATION forming part of Letters Patent No. 412,934, dated October 15, 1889.

Application filed April 6, 1889. Serial No. 306,251. (No model.)

*To all whom it may concern:*

Be it known that I, WILLIAM HENRY SHOUP, a citizen of the United States, residing at Middlebury, in the county of Elkhart and State of Indiana, have invented certain new and useful Improvements in Churns; and I do hereby declare the following to be a full, clear, and exact description of the invention, such as will enable others skilled in the art to which it appertains to make and use the same.

My invention relates to improvements involved in the construction of new and useful mechanism for "churning" and so agitating cream as to result in the concentration of the fatty globules contained therein, thereby producing a superior grade of butter in the form technically known as "grain butter." This result I reach by means of the mechanism hereinafter described and claimed, reference being had to the accompanying drawings, which are to be considered a part of this application, in which similar letters of reference denote corresponding parts in all the views.

Figure 1 is a perspective top view of my invention complete. Fig. 2 is a perspective view of the lid inverted, showing the manner of attaching the blades, which serve the purpose of a dasher. Fig. 3 is a side view of the blades, showing their peculiar construction in being provided with attachments on each end, which are hereinafter specially referred to and described. Fig. 3 further shows how the connection between the cog-wheel and dasher is effected. Fig. 4 is a sectional view on line *x x* of Fig. 2.

In Fig. 1 it will be observed that for applying the motive power to the dashers I arrange a cog-wheel B, of suitable size, immediately in the center and on the upper surface of the lid of the churn, such wheel being securely journaled thereon. On each side of the wheel B, I arrange smaller wheels *b b*, which are connected by proper shafting passing through the lid of the churn to the dashers or blades A A.

For the body of the churn I prefer a rectangular box of suitable size, so constructed as to securely hold the cream to be churned. A A are elliptically-shaped blades or dashers, so arranged that the plane of their bodies will be at right angles with each other, thus producing a reciprocal agitation of the cream.

It will be observed that the arrangement of the cog-wheels above referred to results in a reverse movement to the dashers or blades A A, thus causing a vigorous and continuous agitation of the cream.

In order to increase the agitation of the cream, I provide on one side of both blades or dashers a round hole, into which is to be fitted a revolving wheel, the spokes of which are flattened and arranged so that their surfaces will be acted upon by the cream and cause the wheel to revolve. The other side of the elliptical dasher is to consist of a frame holding a net-work of cloth or wire, through the meshes of which the cream may pass. This arrangement may be seen in Fig. 3. The wire screens above referred to as covering the rectangular openings in the ends of the dashers are to be attached upon one side only of such openings, while the other sides are to remain unprovided with such screens. The other ends of the dashers are to be provided with revolving wheels, as shown. The openings covered by the wire screens, and also those filled by said wheels, extend entirely through the ends of the dashers. The function of said openings, wheels, and screens is to increase the agitation of the cream as the dashers revolve upon their axes. The purpose served by the elliptical form of the dashers is to so displace the cream that the tendency will be to throw it horizontally against the opposite dasher, and also against the sides of the box or body of the churn.

Having described my invention, what I claim as new, and desire to secure by Letters Patent, is—

The combination, with the rectangular body, of two elliptically-shaped dashers set at right angles to each other and arranged to rotate in opposite directions, and having an opening in each end of each dasher, one of such openings being provided with a rotary wheel, while the other is covered by a wire screen, and cog-wheels *b b* and B, connected to the dashers by proper shafting, all substantially as described, and for the purpose named.

In testimony whereof I affix my signature in presence of two witnesses.

WILLIAM HENRY SHOUP.

Witnesses:
DAVID C. HOSTETTER,
IRA WINEGAR.